United States Patent [19]

Heyden

[11] Patent Number: 4,645,900

[45] Date of Patent: Feb. 24, 1987

[54] APPARATUS FOR CUTTING A MOVING MATERIAL WEB TO SHAPE BY BURNING WITH A LASER BEAM

[75] Inventor: Günter Heyden, Neuwied, Fed. Rep. of Germany

[73] Assignee: Winkler & Dünnebier, Maschinenfabrik und Eisengiesserei GmbH & Co. KG, Neuwied, Fed. Rep. of Germany

[21] Appl. No.: 807,317

[22] Filed: Dec. 10, 1985

[30] Foreign Application Priority Data

Dec. 24, 1984 [DE] Fed. Rep. of Germany ....... 3447405

[51] Int. Cl.⁴ ............................................. B23K 26/00
[52] U.S. Cl. ....................... 219/121 LG; 219/121 LT; 219/121 LW
[58] Field of Search .................. 219/121 LG, 121 LN, 219/121 LS, 121 LT, 121 LU, 121 LX, 121 LW, 121 LP, 121 LQ, 12 LR; 346/76 L

[56] References Cited

U.S. PATENT DOCUMENTS

| 3,314,073 | 4/1967 | Becker | 219/121 LW X |
| 3,632,205 | 1/1972 | Marcy | 219/121 LX X |
| 4,049,945 | 9/1977 | Ehlscheid et al. | 219/121 LG |

FOREIGN PATENT DOCUMENTS

2350933  4/1975  Fed. Rep. of Germany .

*Primary Examiner*—C. L. Albritton
*Attorney, Agent, or Firm*—Nies, Webner, Kurz & Bergert

[57] ABSTRACT

An apparatus for cutting a moving material web of paper, cardboard or the like to shape by burning with a deflectable laser beam focussed on the material web is provided, wherein an acousto-optical, frequency-dependent deflection means controlled as a function of the movement of the material web to be cut is used, the deflection element of which lies in the path of the laser beam.

8 Claims, 2 Drawing Figures

APPARATUS FOR CUTTING A MOVING MATERIAL WEB TO SHAPE BY BURNING WITH A LASER BEAM

BACKGROUND OF THE INVENTION

This invention refers to an apparatus for cutting a moving material web of paper, cardboard or the like to shape by burning with a deflectable laser beam focussed on the material web.

An apparatus of the above-given type was published in the German Letters Patent No. 23 50 933. In the subject matter of the German Pat. No. 23 50 933 the laser beam is deflected by a movable mirror arrangement disposed in the beam path between the laser beam source and the material web, wherein the mirrors are moved by electronically controlled, mechanical drive means. The possibilities for use of such an apparatus are limited due to the inertia of the system, especially in the mechanical sphere. This means that the desired high speeds of the material web can not be reached. The result is that the capacity of high-performance machines, for instance for the manufacture of envelope blanks, can not be fully exploited.

SUMMARY OF THE INVENTION

The invention is based on the task of providing an apparatus capable of performing the cut with considerably greater speed, so that the material web can run through the machine at the desired speed.

The solution of this task lies primarily in deflecting the laser beam to be focussed for the cutting without inertia in order to thereby avoid all mechanical aids. In keeping with this train of thought, the proposal within the framework of an apparatus for cutting a moving material web to shape by burning is to provide an acousto-optical, frequency-dependent beam deflecting means controlled as a function of the movement of the material web to be cut, with the deflection element thereof being disposed in the path of the laser beam.

It is advantageous for an element increasing the angle of deflection to be connected after the beam deflection element.

Further features of the invention can be seen in the subclaims and the following description of a preferred embodiment schematically represented in FIGS. 1 and 2 of the drawings and described in greater detail below.

DETAILED DESCRIPTION OF THE DRAWINGS

The embodiment described below refers to a machine for the manufacture of envelopes, through which a material web 11 is moved at high speed, wherein certain sections 12 are cut out by burning with a focussed laser beam 13 during the movement of the material web 11.

Figure 1:
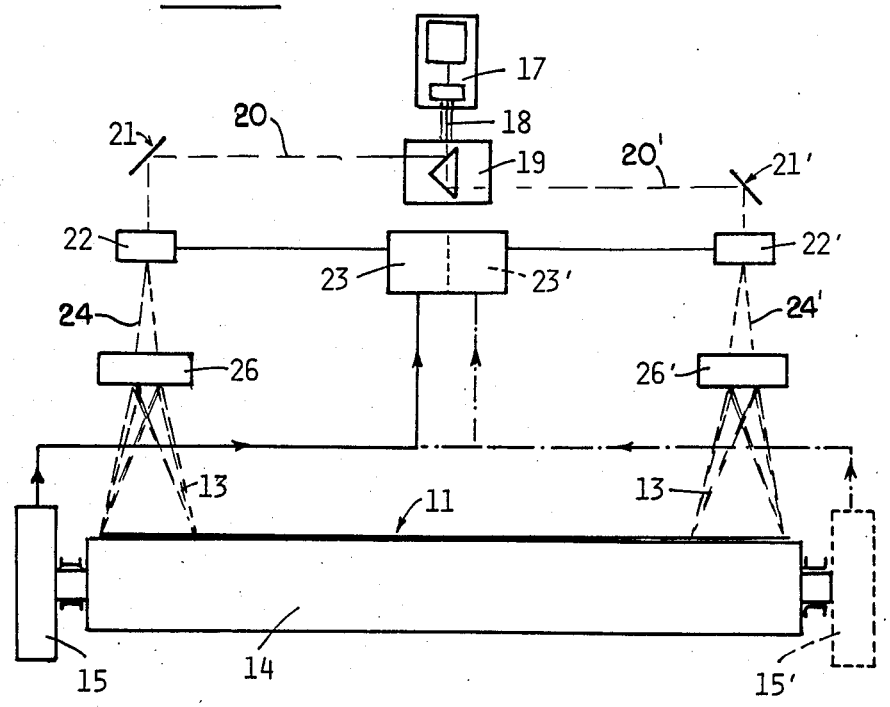
Figure 2:
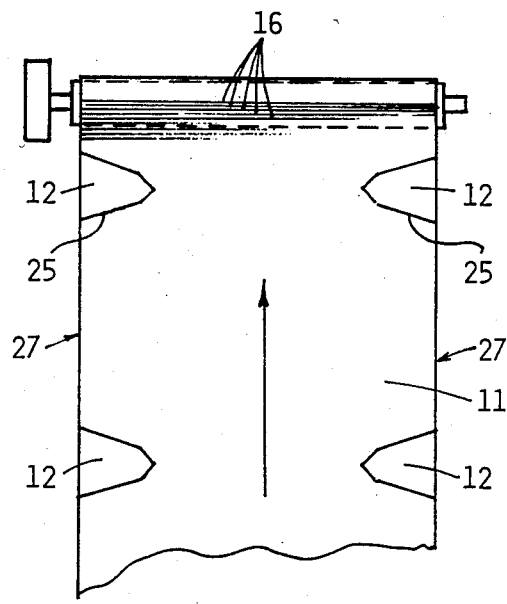

The material web is moved by a transport roller 14 coupled to a pulse generator 15. Signals are issued by the pulse generator, wherein each signal corresponds to a certain small angular sector and each angular sector corresponds to a narrow line 16 along the path of the moving material web 11. The laser beam generator 17 is located above the material web. The laser beam 18 issuing from the generator is split into two beams 20 and 20' in the beam divider 19, and the two beams are then fed via the mirrors 21, 21' to the deflection elements 22 and 22'. The signals issued by the pulse generator are fed to the acousto-optical beam deflection means 23, which effects an inertia-free deflection of the beams 24, 24' leaving the deflection elements, by means of the deflection elements 22, 22' associated therewith. If the deflection elements 22, 22' enable only a small angle of deflection which does not suffice to perform the predetermined cut 25 (FIG. 2) transversely to the material web, it is necessary to connect an additional element 26, 26' in the beam path to enlarge the angle of deflection.

The elements 21, 22 and 26 or 21', 22' and 26' generating the focussed laser beam 13 are adjustable in the direction transverse to the direction of movement of the material web, in order to enable positioning of the starting point of each cut 25 relative to the outer edge 27 of the material web. If the configurations of the cuts 25 in the marginal areas of the material web 11 opposite each other are identical, the deflection of the laser beam is controlled in the same manner by the beam deflection means 23 by corresponding transmission of frequency signals to the deflection elements 22, 22'. If the cuts 25 in one marginal area of the material web are shaped differently than those in the other, opposite marginal area, then different frequency signals must be given by the beam deflection means to the two deflection elements 22, 22'. Of course it is also possible to couple a second pulse generator to the roller 14 and to provide two beam deflection means 23, of which each one controls the one or the other deflection element 22 or 22'.

It is advantageous to couple an electronic working memory to the beam deflection means, which contains the program for the allocation of the corresponding frequencies to the signals coming from the pulse generator. This program is changeable upon completion of the desired course of each cutting curve.

As the material of the webs to be cut has different properties, the laser beam generator 17 should be adjustable with regard to the energy of the laser beam 13, in order to obtain faultless cuts. It is also advantageous to put the aforementioned control of the laser beam generator 17 in a dependent relationship to the cutting speed of the laser beam 13.

I claim:

1. An apparatus for cutting a moving material web of paper, cardboard or the like to shape by burning with a deflectable laser beam focused on the material web, characterized by: at least one frequency-dependent acousto-optical beam deflection means (23), means enabling control of said beam deflection means as a function of the movement of the material web to be cut; at least one deflection element (22), included as part of said beam deflection means, being disposed in the path of the laser beam (18, 20, 24); said means enabling control of said beam deflection means comprising a roller means (14) for conveying or guiding the material web to be cut, at least one pulse generator (15) coupled to said roller means for issuing an impulse as a function of predetermined, changeable circumferential angle sectors of the roller means, and means feeding a signal, corresponding to said impulse, to the beam deflection element (22), whereby the laser beam (24, 13) is deflected, as a function of the frequency-dependent acousto-optical beam deflection means, by a predetermined distance transversely to the direction of movement of the material web (11).

2. An apparatus according to claim 1, characterized in that an element (26) enlarging the angle of deflection in the same direction is disposed in the path of the laser beam (24) deflected by the deflection element (22).

3. An apparatus according to claim 1 or 2, further characterized by a beam dividing device (19) for dividing the laser beam (18) given off by the laser beam generator (17) into two partial beams (20, 20') with each of said partial beams being fed to an associated deflection element (22, 22') by associated deflecting mirrors (21, 21') arranged above the material web (11) and in the area of the margins thereof (27).

4. An apparatus according to claim 3, characterized in that the two beam deflection elements (22, 22') are controlled identically by the beam deflection means (23).

5. An apparatus according to claim 3, characterized in that control signals of different frequencies are fed to the two deflection elements (22, 22') by the beam deflection means (23).

6. An apparatus according to claim 3, characterized in that each of the two deflection elements (22, 22') is associated with its own said beam deflection means (23, 23').

7. An apparatus according to claim 6, characterized in that each of the two beam deflection means (23, 23') is associated with its own said pulse generator (15, 15').

8. An apparatus according to claim 1 or 2, characterized in that the laser beam generator (17) is adjustable with regard to energy intensity of the laser beam (13), depending on the material properties of the web to be cut and/or on the cutting speed of the laser beam (13).

* * * * *